(12) United States Patent
Liu

(10) Patent No.: US 6,481,363 B1
(45) Date of Patent: Nov. 19, 2002

(54) HYDRODYNAMIC PROPULSION FLOW CONTROL FOR MODIFICATION OF FLAP CONTROLLED LIFT

(75) Inventor: Wayne P. Liu, Santa Monica, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/837,745

(22) Filed: Apr. 17, 2001

(51) Int. Cl.[7] .................................................. B63B 1/24
(52) U.S. Cl. ........................................................ 114/274
(58) Field of Search ................................ 114/274–282; 244/213

(56) References Cited

U.S. PATENT DOCUMENTS 3,915,106 A * 10/1975 De Witt
4,039,161 A * 8/1977 Bauer

* cited by examiner

Primary Examiner—Ed Swinehart
(74) Attorney, Agent, or Firm—Jacob Shuster

(57) ABSTRACT

Flow modifying devices are simultaneously operative on the upper and lower surfaces of a fixed stabilizer foil on the submerged pod or hull of an ocean vessel to modify the lift hydrodynamically induced under control of pivotal flaps during propulsion of the vessel. The lift otherwise induced by the pivotal flaps is directionally reversed for all angular positions thereof by the spoiler devices.

5 Claims, 3 Drawing Sheets

HYDRODYNAMIC PROPULSION FLOW CONTROL FOR MODIFICATION OF FLAP CONTROLLED LIFT

The present invention relates in general to control of fluid-dynamic induced lift on foils fixed to the hull of a sea going vessel during propulsion thereof.

BACKGROUND OF THE INVENTION

An important factor in the maneuvering of crafts or vessels within a fluid medium such as seawater involves control over the fluid dynamic lift induced thereon during propulsion. Thus, safe handling of a high-speed ocean going vessel can be enhanced by providing instantaneous control of lift forces produced by a control surface. Ride control on high speed ocean vessels require rapid changes in control surface lift forces to compensate for changing sea state conditions which may instantly alter pitch or roll conditions of the vessel. Currently, changes in the angle of attack of a control surface are required to change the lift imposed thereon. Because of the large hydrodynamic forces experienced by the control surface, changes in the angle of attack and thus lift, often require large hydraulic motor capabilities and can only produce slow changes in lift. These slow changes in control surface lift are inadequate for superior ride control on a high-speed ocean going vessel and furthermore require large actuation forces. It is therefore an important object of the present invention to provide for simple, rapid and low power modification of control surface lift so as to increase the ride control available for high speed vessels.

SUMMARY OF THE INVENTION

In accordance with the present invention, selectively controlled flow separation means is provided for projection simultaneously from both the upper and lower surfaces on the fixed stabilizer of a flapped airfoil, so as to modify the lift produced by the flapped airfoil at all flap angles. Such lift modification by the separation means significantly involves rapid directional reversal of the lift for all angular positions of the flaps within its operational range of position angles.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

Figure 1:
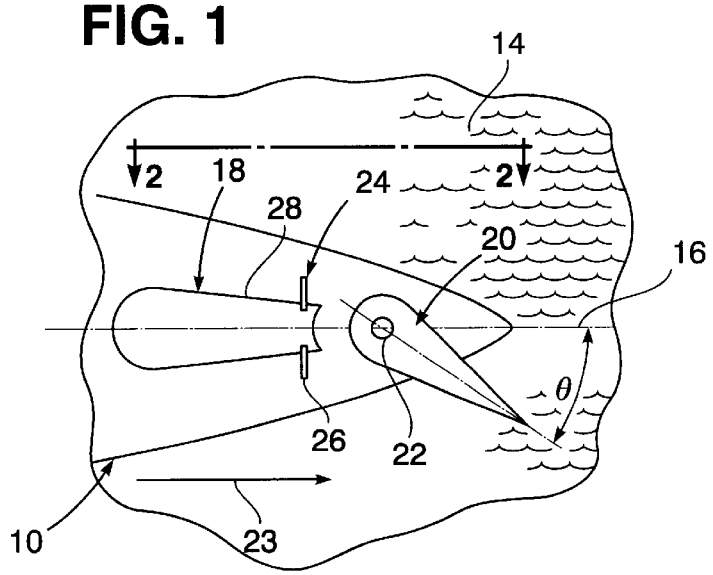
FIG. 1 is a partial side elevation view of a submerged hull or pod with a flapped foil.
Figure 4A:
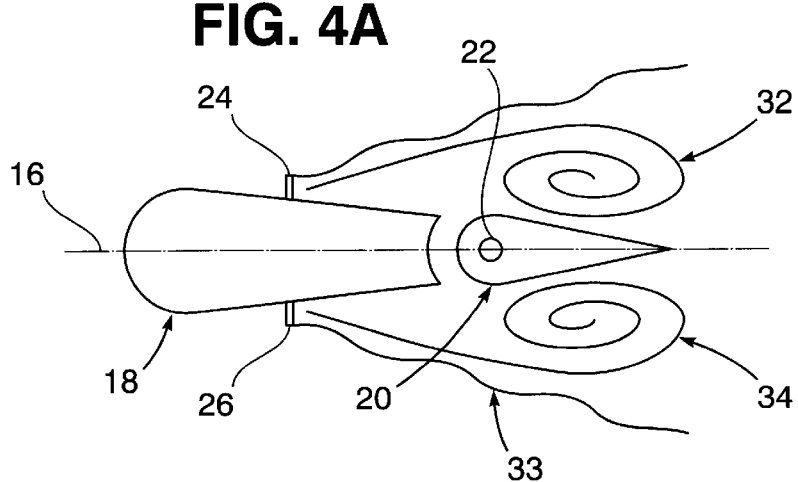
Figure 4B:
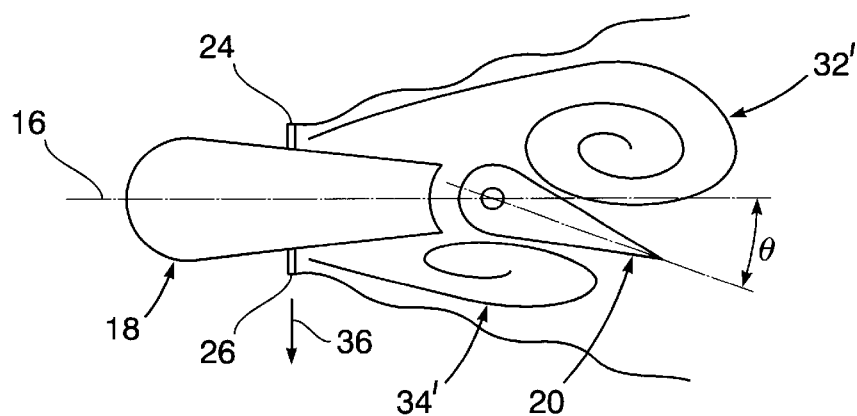
Figure 4C:
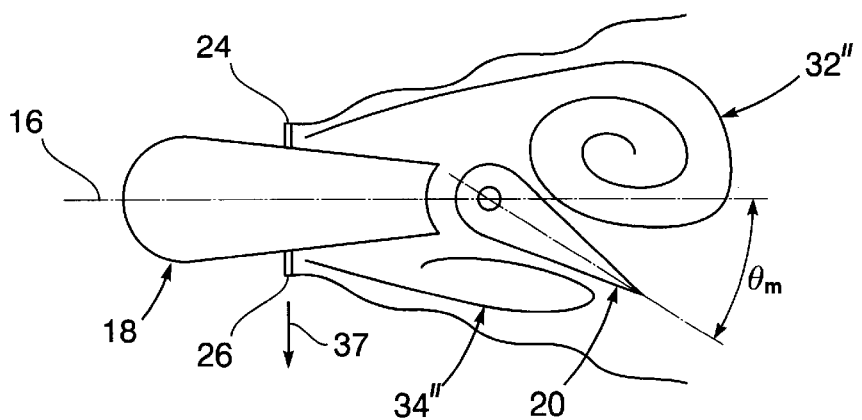
Figure 5:
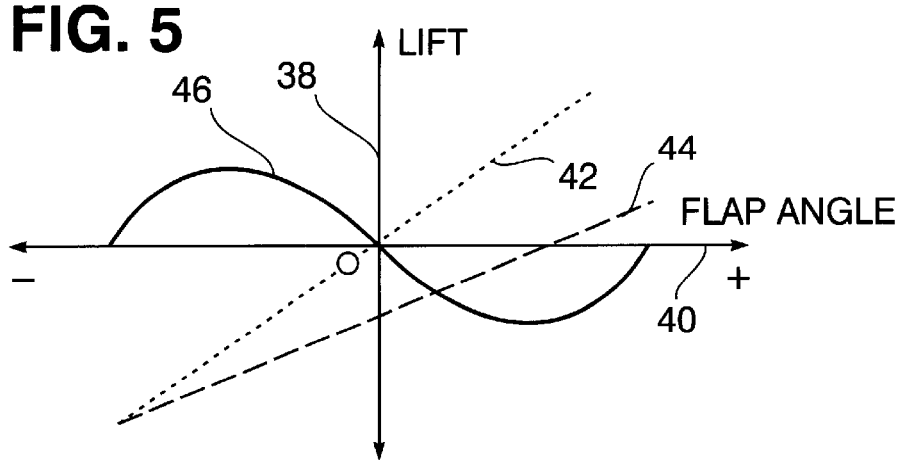
Figure 6A:
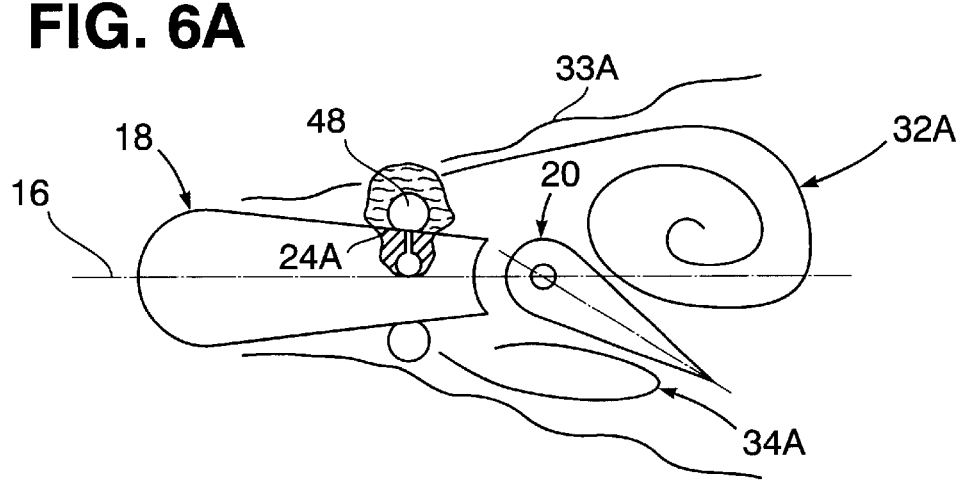
Figure 6B:
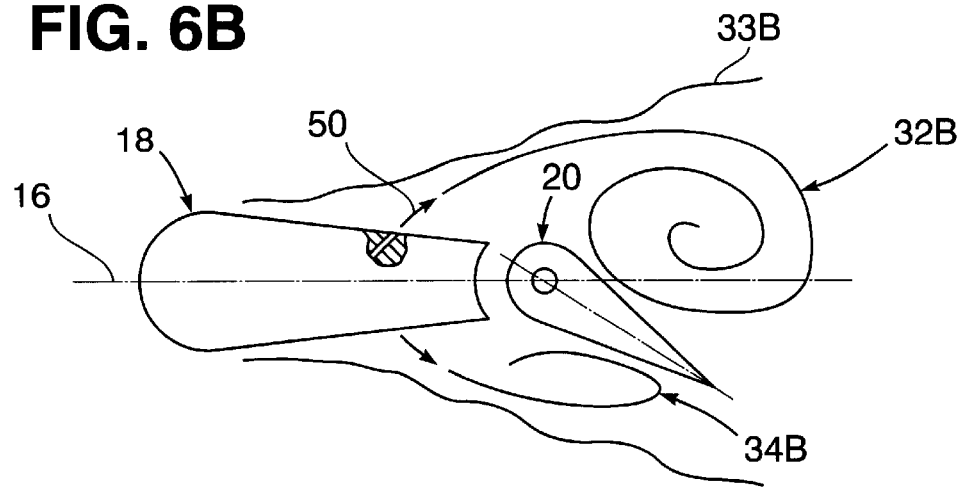

FIGS. 4A, 4B, and 4C, are schematic side elevation views of the fixed stabilizer and moving flap of the flapped foil as shown in FIG. 1, with associated hydrodynamically induced flow patterns in the surrounding seawater for different angular positions of the control flap;

FIG. 5 is a comparative graphical representation of hydrodynamically induced lift as a function of angular flap position of the control flap (flap angle); and FIGS. 6A and 6B show different flow modification means for achieving flow separation on both the top and bottom surfaces of the flapped foil.

DETAILED DESCRIPTION OF PREFERRED EMBODIMENT

Figure 2:
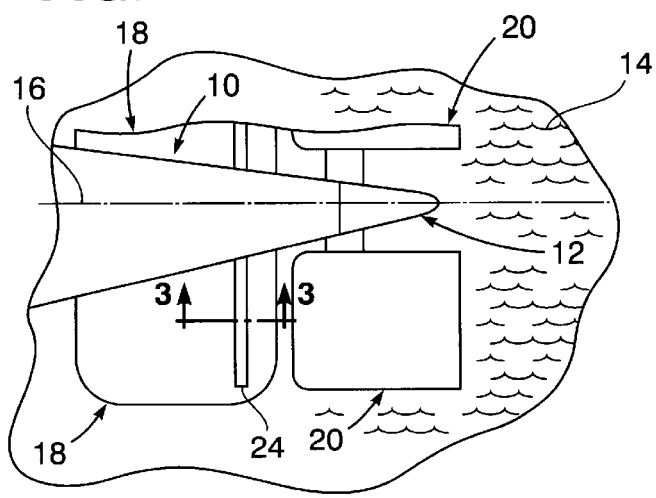
FIG. 2 is a partial top plan view of the submerged hull or pod as seen from section line 2—2 in FIG. 1.

Referring now to the drawing in detail, FIGS. 1 and 2 illustrate a portion of a submerged pod or hull 10 of an ocean going vessel being propelled through a body of a surrounding fluid medium 14 such as seawater or fresh lake water. Also fixedly mounted on the pod or hull 10 and extending laterally relative to the hull axis 16 are a pair of stabilizer foils 18. Associated with each stabilizer foil 18 is a fluid dynamic control flap 20 having a pivot 22 fixed to the hull and intersecting its axis 16 to establish a pivotal axis about which the flaps 20 are angularly displaced by some angle θ so as to hydrodynamically produce underwater lift in a vertical direction in response to fluid flow 23 relative to the hull during its propulsion in a travel direction through the fluid medium 14.

The foregoing described arrangement of stabilizer foils 18 and associated flaps 20 on a submerged pod or hull is already well known in the art. However in the accordance with the present invention, each of the stabilizer foils 18 has flow separation means in the form of a pair of spoiler devices 24 and 26 respectively deployed by projection from its upper and lower foil surfaces in directions perpendicular to the hull axis 16. Such spoiler devices 24 and 26 may take the form of fins, wedges or bubble-like projections from the stabilizer foil 18 located in forwardly spaced relation to the pivotal flaps 20 in the travel direction as shown in FIGS. 1 and 2.

Figure 3:
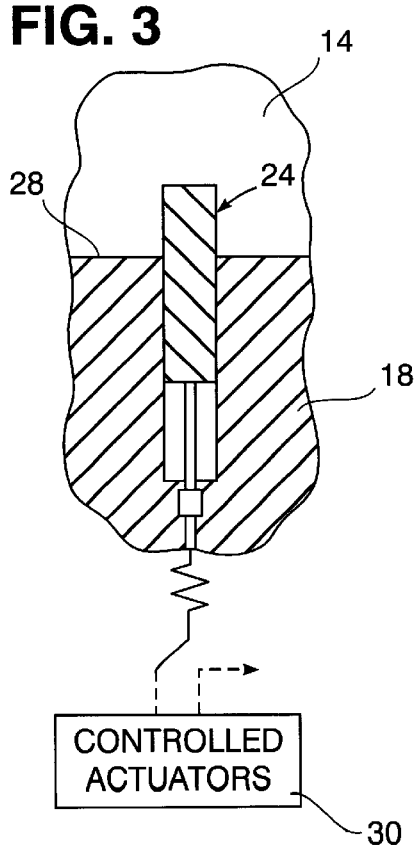
FIG. 3 is a partial section view taken substantially through a plane indicated by section line 3—3 in FIG. 2.

FIG. 3 shows the spoiler device 24 in the form of a fin projected from the top hydrodynamic surface 28 of the stabilizer foil 18 to an operative position from which it may be retracted to an inoperative position within the body of the stabilizer foil under control of relatively low actuation forces generated by diagrammatically depicted actuators 30. The other spoiler device 26 is similarly mounted and displaceable relative to the lower surface of the stabilizer foil by means of the actuators 30. Selectively controlled simultaneous deployment of both spoiler devices 24 and 26 on each stabilizer foil 18 is thereby effected in order to modify hydrodynamically produced lift, varied in response to pivotal displacement of the flaps 20, as hereinafter described. Thus, the relatively low actuation forces generated by the actuators 30 achieve hydrodynamic lift modification by projecting the spoiler devices 24 and 26 in directions normal to the flow direction 23.

FIGS. 4A, 4B and 4C illustrate the hydrodynamic effects, produced by the deployment of both spoiler devices 24 and 26, on lift induced as a result of pivotal displacement of the control flaps 20 relative to the hull axis 16 between 0 deg and a maximum displacement angle ($\theta_m$) of 25 deg. Deployment of both spoiler devices 24 and 26 while the flaps 20 are positioned at a zero angle as depicted in FIG. 4A, results in a net zero lift during forward propulsion of hull 10 with the foils 18 thereon. Under such conditions, strong vortices 32 and 34, as diagrammed in FIG. 4A, are produced downstream of the spoiler devices within the fluid medium 14 in their separation wake 33, with the cores of such vortices 32 and 34 being disposed in equally spaced proximity to the upper and lower surfaces of each flap 20.

When the flaps 20 are displaced to a pivotal position at an angle θ of more than 0 deg. but less than 25 deg. for example, as shown in FIG. 4B, the core of each lower vortex 34' is closer to the lower surface of the flap 20 than the spacing of the core of the upper vortex 32' from the upper flap surface. As a result of a flap-separation wake interaction on the lower flap surface, suction hydrodynamically developed on the lower foil and flap surfaces is sufficiently stronger than the suction on the upper foil and flap surface to directionally reverse the net upward lift otherwise produced by such pivotal displacement of the flaps 20 in the absence of the flow separation devices. Accordingly, a reversed downward lift force 36 is produced by pivotal displacement of flap 20 from its zero angle position beyond a minimal amount as shown in FIG. 4B.

When the flaps 20 are pivotally displaced by a maximum amount to the maximum angle of $\theta_m$ as shown in FIG. 4C, the flap-separation wake interaction is minimized and the strength of the lower vortex 34" on the lower flap is correspondingly mitigated relative to the strength of the upper vortex 32" on the upper flap surface. Accordingly, there is a minimal amount of directional reversal of the net lift force otherwise produced by maximum angular flap displacement in the absence of spoilers, resulting in a minimized downward lift force 37 as denoted in FIG. 4C.

FIG. 5 graphically depicts variations in net lift along vertical scale 38 as a function of flap angle along the abscissa scale 40, obtained as a result of comparative experiments. Without deployment of any spoilers, net lift varying as a function of flap angle is reflected by dotted straight-line curve 42. By use of a single spoiler on only the upper flap surface, lift as a function of flap angle is reflected by straight-line curve 44. Only with a double spoiler arrangement for each stabilizer foil 18 as shown in FIGS. 1–4, net lift varies as a function of flap angle in accordance with curve 46 as shown in FIG. 5, reflecting a compete reversal of non-spoiler lift throughout the entire range of flap angles because of the high pressure fields over the stabilizer, producing lift reversal at low flap angles and lift neutralization at high flap angles.

The rapidity and magnitude of changes in lift achieved in accordance with the present invention is not from slow and force intensive flap angle changes, but rather from rapid and small changes in double spoiler projections. Hence lift characteristics of a flapped airfoil, as denoted in FIG. 5, can be switched quickly from curve 42 to curve 46 with little actuation force.

In view of the foregoing described double spoiler arrangement of the present invention, more direct and immediate reversal or neutralization of fluid dynamic lift is achievable in connection with flapped foils, such as aircraft wings as well as stabilizer foils as hereinbefore described in association with underwater pods or hulls. Such a double spoiler arrangement is particularly useful for producing large and instantaneous changes in lift to maintain minimum pitch and roll of an ocean going vessel.

The spoiler devices 24 and 26 as hereinbefore described are shown to be spaced forwardly of the trailing edge of the stabilizer foil 18. Such location of the spoiler devices on foil may be anywhere between the foil trailing edge and its leading edge. Also the spoiler devices and 26 while shown to be projecting at a 90 degree angle from the foil surfaces, may project therefrom at a rearwardly extending deflection angle between 90° and 135° from the flow stream line 23.

Furthermore, the spoiler devices have a sufficient projection height of 10 in. for example to produce the vortex enclosing wake formations 33 as depicted in FIG. 4.

FIGS. 6A and 6B respectively illustrate performance of the downstream hydrodynamic effect on the surrounding fluid medium 14 as shown in FIG. 4B, by lift modification means on the top and bottom surfaces of the stabilizer foil 18 which differ from the spoiler arrangement hereinbefore described. As shown in FIG. 6A, bubbles 48 are emitted from the top and bottom surfaces of the foil 18 under selective control to produce the vortices 32A and 34A between the fluid separation wakes 33A. Similarly, vortices 32B and 34B are produced between separation wakes 33B for lift modification purposes, as shown in FIG. 6B, by emission of flow streams 50.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a foil having upper and lower surfaces and a flap that is selectively displaced within a predetermined range of angular positions relative to a propulsion axis to controllably induce fluid dynamic lift on the foil during propulsion thereof through a fluid medium along said propulsion axis, an arrangement for modifying the lift induced including: means operatively mounted by the foil for effecting flow modification within the fluid medium from a location thereon in forwardly spaced relation to the flap; and deployment means selectively effecting said flow modification for directional reversal of said lift induced by displacement of the flap to said angular positions within said predetermined range.

2. The lift modifying arrangement as defined in claim 1, wherein said means for effecting flow modification includes spoiler devices respectively displaceable between retracted positions within the foil and operative positions projected respectively from upper and lower surfaces of the foil perpendicular to the propulsion axis, said spoiler devices being simultaneously displaced by the deployment means to the operative positions projecting from both the upper and lower surfaces of the foil to obtain said directional reversal of the lift in all of the angular positions of the flap.

3. The combination as defined in claim 2, wherein said fluid medium is seawater and said foil is a stabilizer on a hull to which the foil is fixed.

4. The combination as defined in claim 1, wherein said fluid medium is seawater and said foil is a stabilizer on a hull to which the foil is fixed.

5. The combination as defined in claim 4, wherein the means for effecting flow modification includes: air flow emitting devices respectively mounted on the upper and lower surfaces of the foil.

* * * * *